(12) United States Patent
Jean-Baptiste-Dit-Dominique et al.

(10) Patent No.: US 10,920,046 B2
(45) Date of Patent: Feb. 16, 2021

(54) RUBBER COMPOSITION INCLUDING A DIENE ELASTOMER COMPRISING CARBONATE FUNCTIONAL GROUPS

(71) Applicant: COMPAGNIE GENERALE DES ETABLISSEMENTS MICHELIN, Clermont-Ferrand (FR)

(72) Inventors: François Jean-Baptiste-Dit-Dominique, Clermont-Ferrand (FR); Rachid Matmour, Clermont-Ferrand (FR); Adeline Jasselin, Clermont-Ferrand (FR); Benoit Schnell, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 98 days.

(21) Appl. No.: 16/318,996

(22) PCT Filed: Jul. 17, 2017

(86) PCT No.: PCT/FR2017/051944
§ 371 (c)(1),
(2) Date: Jan. 18, 2019

(87) PCT Pub. No.: WO2018/015646
PCT Pub. Date: Jan. 25, 2018

(65) Prior Publication Data
US 2019/0276648 A1    Sep. 12, 2019

(30) Foreign Application Priority Data

Jul. 18, 2016   (FR) .................... 16 56824

(51) Int. Cl.
| | | |
|---|---|---|
| C08L 9/06 | (2006.01) |
| B60C 1/00 | (2006.01) |
| C08F 236/10 | (2006.01) |
| C08K 3/04 | (2006.01) |
| C08K 3/36 | (2006.01) |
| C08K 3/22 | (2006.01) |
| C08K 5/18 | (2006.01) |
| C08K 5/103 | (2006.01) |
| C08L 91/00 | (2006.01) |
| C08K 5/31 | (2006.01) |
| C08K 3/06 | (2006.01) |
| C08K 5/5419 | (2006.01) |
| C08K 5/47 | (2006.01) |
| C08L 45/00 | (2006.01) |
| C08K 5/00 | (2006.01) |
| C08F 236/06 | (2006.01) |
| C08K 3/013 | (2018.01) |

(52) U.S. Cl.
CPC ............... *C08L 9/06* (2013.01); *B60C 1/00* (2013.01); *B60C 1/0016* (2013.01); *C08F 236/10* (2013.01); *C08K 3/04* (2013.01); *C08K 3/06* (2013.01); *C08K 3/22* (2013.01); *C08K 3/36* (2013.01); *C08K 5/103* (2013.01); *C08K 5/18* (2013.01); *C08K 5/31* (2013.01); *C08K 5/47* (2013.01); *C08K 5/5419* (2013.01); *C08L 45/00* (2013.01); *C08L 91/00* (2013.01); *C08F 236/06* (2013.01); *C08F 2800/10* (2013.01); *C08F 2800/20* (2013.01); *C08K 3/013* (2018.01); *C08K 5/0025* (2013.01); *C08L 2312/00* (2013.01)

(58) Field of Classification Search
None
See application file for complete search history.

(56) References Cited

U.S. PATENT DOCUMENTS

| 5,977,238 A | 11/1999 | Labauze |
| 2017/0158849 A1* | 6/2017 | Coste .................. C08J 3/24 |

FOREIGN PATENT DOCUMENTS

| EP | 0001088 A1 | 3/1979 |
| EP | 0890607 A1 | 1/1999 |
| WO | 2012043136 A1 | 4/2012 |
| WO | 2016/001052 | * 7/2016 |

OTHER PUBLICATIONS

International Search Report and Written Opinion (with translations) regarding Application No. PCT/FR2017/051944 dated Oct. 2, 2017.

* cited by examiner

*Primary Examiner* — Robert T Butcher
(74) *Attorney, Agent, or Firm* — Dickinson Wright PLLC

(57) ABSTRACT

A rubber composition based on a reinforcing filler and on an elastomer comprising units of a 1,3-diene monomer and bearing carbonate functions, each present in a 1,3-dioxolan-2-one ring is provided. The composition has improved reinforcement.

22 Claims, No Drawings

RUBBER COMPOSITION INCLUDING A DIENE ELASTOMER COMPRISING CARBONATE FUNCTIONAL GROUPS

This application is a 371 national phase entry of PCT/FR2017/051944 filed on 17 Jul. 2017, which claims benefit of French Patent Application No. 1656824, filed 18 Jul. 2016, the entire contents of which are incorporated herein by reference for all purposes.

BACKGROUND

1. Technical Field

The field of the present invention is that of diene rubber compositions, in particular diene rubber compositions for tyres.

2. Related Art

Ideally, a rubber composition intended to be used in a tyre must meet a large number of technical requirements. One of these is the cohesion of the rubber composition. Good cohesion of a rubber composition is generally reflected in a good level of reinforcement of the rubber composition. The reinforcement of a rubber composition may be improved by introducing, into the rubber composition, reinforcing fillers, coupling agents intended to couple the rubber and the reinforcing filler, or else functional elastomers. Among the functional elastomers known to improve the reinforcement of a rubber composition, mention may be made of elastomers bearing, for example, silanol, alkoxysilane or carboxylic acid functions, as described for example in document WO 2001/090237. It is also known that the reinforcement of a composition comprising a diene polymer and a silica requires the use of a coupling agent, as is described in the Applicants' patent applications, in particular in the above-mentioned document WO 2001/090237. For reasons of cost of production of the composition, it may be beneficial to dispense with the coupling agent. Consequently, it is still a concern to be able to have novel functional polymers which make it possible to improve the reinforcement of a polymer composition comprising a reinforcing filler.

Diene elastomers bearing carbonate functions —O—CO—O— present in 1,3-dioxolan-2-one rings are known for being used as electrolytes in membranes, as described in documents US 2007/0191578 and WO 2014/032803. However, they are not described as an ingredient of a rubber composition.

SUMMARY

The Applicants have discovered that the use, in a rubber composition, of a diene elastomer bearing carbonate functions, each present in 1,3-dioxolan-2-one rings, makes it possible to improve the reinforcement of the rubber composition comprising a reinforcing filler, even in the absence of coupling agents in the case in which the reinforcing filler is a silica.

Thus, a first subject of the invention is a rubber composition based on a reinforcing filler and on an elastomer comprising units of a 1,3-diene monomer and bearing carbonate functions, each present in a 1,3-dioxolan-2-one ring.

The invention also relates to a tyre which comprises the rubber composition in accordance with the invention.

The invention also relates to a process for preparing the rubber composition in accordance with the invention in the presence of a crosslinking agent.

DETAILED DESCRIPTION OF EXAMPLE EMBODIMENTS OF THE INVENTION

In the present description, unless expressly indicated otherwise, all the percentages (%) shown are % by weight. The abbreviation "phr" means parts by weight per hundred parts of elastomer (of the total of the elastomers, if several elastomers are present).

Furthermore, any interval of values denoted by the expression "between a and b" represents the range of values greater than "a" and lower than "b" (that is to say, limits a and b excluded), whereas any interval of values denoted by the expression "from a to b" means the range of values extending from "a" up to "b" (that is to say, including the strict limits a and b).

The expression "composition based on" should be understood as meaning, in the present description, a composition comprising the mixture and/or the in situ reaction product of the various constituents used, some of these base constituents (for example the elastomer, the filler or other additive conventionally used in a rubber composition intended for the manufacture of tyres) being capable of reacting or intended to react with one another, at least in part, during the various phases of manufacture of the composition intended for the manufacture of tyres.

The compounds mentioned in the description may be of fossil or biobased origin. In the latter case, they may partially or completely result from biomass or be obtained from renewable starting materials resulting from biomass. Polymers, plasticizers, fillers, etc., are especially concerned.

In the present application, "carbonate function" is intended to mean the group of formula —O(C=O)O—. The carbonate function of use for the purposes of the invention is found in a cyclic structure since it is in the form of the 1,3-dioxolan-2-one ring.

In the present application, "1,3-diene monomer unit" is intended to mean a unit which results from the insertion of a 1,3-diene monomer into a growing polymer chain. As is known, units of a 1,3-diene monomer may result from a 1,2- or 1,4-insertion of the 1,3-diene monomer into the polymer chain. In the case of a 1,4-insertion, they may be in the cis or trans configuration.

In the present application, the word "(meth)acrylate" indiscriminately denotes acrylate and methacrylate.

In the present description, the expression "pendant" relating to the carbonate function is used in the same sense as the term "pendant" used in the definition of "pendant group" given by IUPAC, PAC, 1996, 68, 2287.

The elastomer of use for the purposes of the invention comprises units of a 1,3-diene monomer. As 1,3-diene monomer, mention may be made of those having 4 to 8 carbon atoms, such as, for example, 1,3-butadiene, 2,3-dimethyl-1,3-butadiene, isoprene or piperylene. The halogenated derivatives thereof, such as, for example, chloroprene, are also suitable. The 1,3-diene monomer may also consist of a mixture of these monomers, in which the 1,3-diene monomer units are made up of the monomer units of each of the monomers composing the mixture. Preferably, the 1,3-diene is 1,3-butadiene, isoprene or the mixture thereof. More preferentially, the 1,3-diene is 1,3-butadiene.

According to any one of the embodiments of the invention, the 1,3-diene monomer units preferably represent more than 50% by weight of the polymer.

According to any one of the embodiments of the invention, the 1,3-diene monomer units resulting from a 1,4-insertion in the polymer chain preferentially represent more than 15 mol %, more preferentially more than 30 mol % of the 1,3-diene monomer units.

The elastomer of use for the purposes of the invention also bears carbonate functions which are each present in a 1,3-dioxolan-2-one ring. In the presence of the reinforcing filler, such as a carbon black or a silica, it is assumed that the carbonate functions form interactions with the filler via chemical functions present on the filler, making it possible to improve the reinforcement of the rubber composition.

Preferably, the carbonate functions are pendant and located outside the ends of the elastomer chain. The presence of pendant 1,3-dioxolan-2-one rings located outside the ends of the polymer chain further improves the reinforcing properties in the rubber composition containing a reinforcing filler, even in the absence of a coupling agent in the case in which the reinforcing filler is a silica. In particular, the pendant position of the carbonate functions makes the carbonate functions more accessible to the chemical functions present at the surface of the reinforcing filler, which promotes interaction between the carbonate functions and the reinforcing filler.

Even more preferentially, the carbonate functions are present in monomer units of a vinyl monomer that is at least substituted by a group containing a 1,3-dioxolan-2-one ring.

The vinyl monomer is preferably a vinyl monomer containing the group 2-oxo-1,3-dioxolan-4-yl of formula (I).

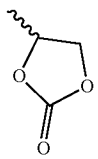

(I)

Those skilled in the art understand that the symbol ∿∿ used in formula (I) represents an attachment of the CH of the ring to the vinyl monomer.

More preferentially, the vinyl monomer has the subunit $CH_2=C<$. The presence of this subunit in the vinyl monomer promotes the copolymerization of the vinyl monomer with the 1,3-diene in the synthesis of the elastomer of use for the purposes of the invention.

According to a particular embodiment, the vinyl monomer is a (meth)acrylate monomer of formula (II). The vinyl monomer may also be a mixture of (meth)acrylates of formula (II) which differ from one another by the $R_1$ or $R_2$ groups.

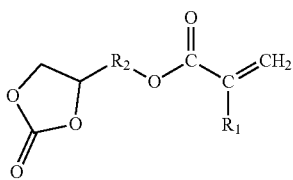

(II)

in which:
$R_1$ is a hydrogen or a methyl,
$R_2$ is a hydrocarbon-based chain which may be interrupted or substituted by one or more heteroatoms.

Preferably, the (meth)acrylate monomer of formula (II) is selected from the group consisting of compounds of formula (III), (IV), (V) and mixtures thereof.

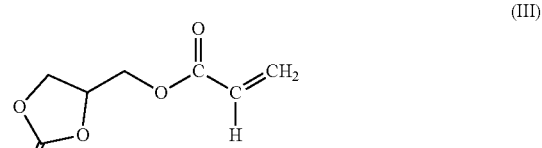

(III)

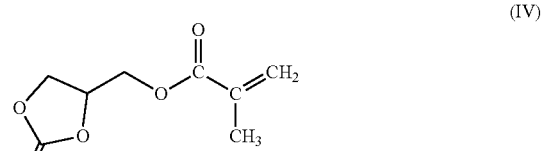

(IV)

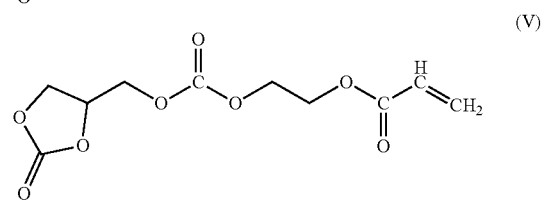

(V)

More preferentially, the (meth)acrylate monomer of formula (II) is the compound of formula (III), the compound of formula (IV), or the mixture thereof.

The content of carbonate functions is preferably between 0.1 and 20 mol per 100 mol of monomer units constituting the elastomer of use for the purposes of the invention. Below the value of 0.1, the improvement of the reinforcement in the rubber composition may be deemed to be insufficient for certain rubber components of the tyre which are highly loaded by large deformations with high stress. Above the value of 20, the improvement of the reinforcement is accompanied by stiffening of the polymer composition, which may be deemed to be too great for certain rubber components of the tyre which have to be sufficiently deformable, for example, to absorb impacts. For certain applications, the content of carbonate functions is more preferentially between 0.1 and 5 mol per 100 mol of monomer units constituting the elastomer of use for the purposes of the invention.

According to one embodiment of the invention, the elastomer of use for the purposes of the invention also contains units of a vinylaromatic monomer. As vinylaromatic monomer, the following are suitable for example: styrene and aromatic compounds comprising a double bond that is polymerizable by the radical route, such as, for example, compounds resulting from alkylation of the styrene, halogenation of the styrene, haloalkylation of the styrene and ether derivatives of the styrene. Preferably, the vinylaromatic monomer is styrene.

According to this particular embodiment of the invention, the vinylaromatic monomer units preferentially represent less than 45%, more preferentially less than 35% by weight of the elastomer of use for the purposes of the invention.

According to a first preferential variant of the invention, the elastomer of use for the purposes of the invention is a copolymer of a 1,3-diene and a vinyl monomer that is at least substituted by a group containing a 1,3-dioxolan-2-one ring, the 1,3-diene and the vinyl monomer being defined according to any one of the embodiments of the invention.

According to a second preferential variant of the invention, the elastomer of use for the purposes of the invention is a terpolymer of a 1,3-diene, a vinyl monomer that is at least substituted by a group containing a 1,3-dioxolan-2-one ring, and a vinylaromatic monomer, the 1,3-diene, the vinyl monomer and the vinylaromatic monomer being defined according to any one of the embodiments of the invention.

The preferential modes stated in the above-described embodiments of the invention may also apply equally to the first and to the second variant.

According to any one of the embodiments of the invention, the carbonate function may be provided along the elastomer chain by radical polymerization of a monomeric mixture comprising 1,3-diene, the vinyl monomer that is at least substituted by a group containing a 1,3-dioxolan-2-one ring, and where appropriate the vinylaromatic monomer.

The radical polymerization may be carried out in suspension or in emulsion, preferably in emulsion in order to promote the uniformity of the size of the particles and the obtaining of macromolecular chains of high molecular weight.

In order to initiate the radical polymerization mechanism, it is possible to use all the customary free radical initiators. The radical initiators may be hydrogen peroxide, organic peroxides such as cyclohexanone peroxide, benzoyl peroxide, lauroyl peroxide, tert-butyl hydroperoxide, cumene hydroperoxide, p-menthane hydroperoxide, di-tert-butyl peroxide and dicumyl peroxide, azo compounds such as azobisisobutyronitrile or 2,2'-azobis(2-methylpropionamidino) dihydrochloride, inorganic peroxides, such as potassium, sodium or ammonium persulfate.

The compounds mentioned above may also be used in redox systems which involve transition metal salts such as ferrous sulfate or iron(II) pyrophosphate. Preferably, the transition metal salt(s) represent from 0.01 to 10 phr, in particular from 0.1 to 5 phr. These transition metal salts may optionally be combined with reducing agents. As reducing agent, mention may be made of sodium formaldehyde sulfoxylate dihydrate (Rongalit®), the technical mixture of disodium 2-hydroxy-2-sulfinate, disodium 2-hydroxy-2-sulfonate and sodium sulfite (Bruggolite FF6® or Bruggolite FF7®), but-1-ene-3-ol, hydroxylamine salts, sodium dialkyldithiocarbamate, sodium bisulfite, ammonium bisulfite, sodium dithionite, ascorbic acid, tartaric acid, erythorbic acid, boric acid, urea, formic acid. Preferably, the transition metal salt(s) represent from 0.01 to 10 phr, preferably from 0.1 to 5 phr. The initiators may be used alone or in combinations of two or more. Preferably, the initiator(s) represent from 0.1 to 10 phr, in particular from 0.2 to 10 phr, more preferentially from 0.2 to 5 phr. The initiator may be added to the polymerization medium either in whole or in part at the start, and/or continuously or intermittently during the polymerization.

In a known way, in order to control the gel content and the macrostructure of the elastomer, transfer agents may be introduced into the polymerization medium and the conversion of the monomers is preferably limited to 75%. As transfer agents, mention may be made of mercaptans with a chain length of C10-C14, such as n-dodecylmercaptan, tert-dodecylmercaptan, mercaptopropionic acid, methyl mercaptopropionate, or alcohols or aldehydes such as isopropanol and acetaldehyde, diterpene, terpinolene or gamma-terpinene and thioglycols. Preferably, the initiator(s) represent from 0.1 to 10 phr, preferably from 0.2 to 10 phr, more preferentially from 0.2 to 5 phr.

In order to stabilize the aqueous emulsion, use is also made, in a known way, of surfactants. The surfactant(s) of use in the process according to the invention may be chosen from non-ionic, anionic or cationic surfactants, preferentially from anionic or cationic surfactants. As anionic surfactants, mention may especially be made of all the anionic surfactants comprising at least one C6-C40 alkyl group or at least one aromatic ring substituted by a C6-C40 alkyl group, and at least one anionic group chosen from sulfates, sulfonates, phosphates, phosphonates and carboxylates. Preferably, the anionic surfactant(s) comprising at least one C6-C40 alkyl group or at least one aromatic ring substituted by a C6-C40 alkyl group are chosen from sodium stearate, sodium lauryl sulfate, sodium lauryl ether sulfate, dehydrogenated resin acids and also the alkali metal salts thereof, and sodium dodecylbenzene sulfonates and mixtures of these compounds. As cationic surfactants, mention may especially be made of all the cationic surfactants comprising at least one C6-C40 alkyl group or at least one aromatic ring substituted by a C6-C40 alkyl group, and at least one cationic group chosen from ammoniums and pyridiums. Preferably, the cationic surfactant(s) are chosen from salts of alkyltrimethylammonium, such as trimethyldecylammonium chloride or bromide and benzalkonium salts and mixtures of these compounds. Preferably, said surfactant(s) of use in the process according to the invention are chosen from trimethyldecylammonium chloride, sodium dodecyl sulfate and sodium stearate. Preferably, the surfactant(s) represent from 1 to 20 phr, in particular from 1 to 10 phr.

Also in a known way, in order to avoid the possible degradation of the initiator by stabilizing the pH of the emulsion, use may be made of a buffer. By way of example, mention may be made of phosphate buffers such as the mixture of ammonium hydrogen phosphate and disodium hydrogen phosphate. Preferably, in the case in which the buffer(s) are incorporated in the reaction medium, they represent from 1 to 20 phr, in particular from 1 to 10 phr.

The polymerization process is generally carried out in a reactor devoid of oxygen at a polymerization temperature ranging from 0 to 100° C., preferentially from 5 to 70° C., more preferentially between 5 and 10° C. or between 35 and 60° C. and optionally with gradual or stepwise changes in temperature. The polymerization may be carried out continuously or batchwise.

In order to stop the polymerization reaction at the correct conversion, in a known way, a reducer is typically introduced, the stopper. By way of example, mention may be made of the family of the phenols, such as hydroquinone, resorcinol, hydroxylamines such as N,N-diethylhydroxylamine. Preferably, the stopper(s) represent from 0.05 to 5 phr, in particular from 0.1 to 3 phr.

Once synthesized, the polymer may equally be in the latex state or in the solid state, for example to be mixed with a reinforcing filler with a view to preparing a composition.

In order to recover the polymer in the latex phase and without residual monomers, it is preferable to carry out a step of devolatilization of these monomers, most generally by steam stripping. In order to recover the polymer in solid form, it is necessary to add a step of destabilization of the emulsion, with or without a prior stripping step, and a step of drying the coagulum.

At the end of polymerization, the residual monomers are preferably eliminated by a step of devolatilization. Subsequently, the emulsion is destabilized with or without a prior stripping step. In order to avoid opening of the cyclic carbonate functions, the emulsion is destabilized by addition of a third substance, for example an inorganic salt such as calcium, magnesium, potassium or sodium chloride, magnesium or sodium sulfate or an organic salt such as magnesium or calcium acetate. The latex may also be coagulated by the addition of a solvent chosen from ketones and alcohols and especially acetone, methanol, isopropanol, n-butanol and ethanol. The coagulum is subsequently generally washed with water. Finally, the polymer is dried once it has been coagulated. Preferably, the polymer may be dried under vacuum or at atmospheric pressure while flushing with nitrogen. The drying temperature may vary from room temperature (25° C.) to 130° C., preferentially from room temperature to 100° C., and more preferentially from room temperature to 70° C. The drying times are typically between 10 and 72 h, preferably between 16 h and 50 h.

The reinforcing filler of use for the purposes of the invention may be any type of "reinforcing" filler known for its abilities to reinforce a rubber composition of use for the manufacture of tyres, for example an organic filler, such as carbon black, a reinforcing inorganic filler, such as silica, with which is generally combined, in a known way, a coupling agent, or else a mixture of these two types of fillers.

Such a reinforcing filler typically consists of nanoparticles, the (weight-) average size of which is less than a micrometer, generally less than 500 nm, most commonly between 20 and 200 nm, in particular and more preferentially between 20 and 150 nm.

All carbon blacks, especially the blacks conventionally used in tyres or their treads ("tyre-grade" blacks), are suitable as carbon blacks. Mention will more particularly be made, among the latter, of the reinforcing carbon blacks of the 100, 200 or 300 series or the blacks of the 500, 600 or 700 series (ASTM grades). These carbon blacks can be used in the isolated state, as commercially available, or in any other form, for example as support for some of the rubber additives used.

"Reinforcing inorganic filler" should be understood here as meaning any inorganic or mineral filler, regardless of its colour and its origin (natural or synthetic), also known as "white filler", "clear filler" or even "non-black filler", in contrast to carbon black, capable of reinforcing, by itself alone, without means other than an intermediate coupling agent, a rubber composition intended for the manufacture of pneumatic tyres, in other words capable of replacing, in its reinforcing role, a conventional tyre-grade carbon black; such a filler is generally characterized, in a known way, by the presence of hydroxyl (—OH) groups at its surface.

Mineral fillers of the siliceous type, preferably silica ($SiO_2$), are especially suitable as reinforcing inorganic fillers. The silica used may be any reinforcing silica known to those skilled in the art, especially any precipitated or fumed silica exhibiting a BET surface area and a CTAB specific surface area both of less than 450 m$^2$/g, preferably from 30 to 400 m$^2$/g, especially between 60 and 300 m$^2$/g. As highly dispersible precipitated silicas (known as "HDSs"), mention will for example be made of the silicas Ultrasil 7000 and Ultrasil 7005 from Degussa, and the silicas Zeosil 1165MP.

The physical state under which the reinforcing inorganic filler is provided is not important, whether in the form of a powder, of microbeads, of granules or else of beads. Of course, reinforcing inorganic filler is also understood to mean mixtures of different reinforcing inorganic fillers, in particular of highly dispersible silicas as described above.

According to a specific embodiment of the invention, the inorganic filler, preferentially a silica, represents more than 50% by weight of the weight of the reinforcing filler of the rubber composition. It is then said that the reinforcing inorganic filler is predominant.

When it is combined with a predominant reinforcing inorganic filler, such as silica, the carbon black is preferably used at a content of less than 20 phr, more preferentially of less than 10 phr (for example, between 0.5 and 20 phr, especially between 2 and 10 phr). Within the intervals indicated, the colouring properties (black pigmenting agent) and UV-stabilizing properties of the carbon blacks are beneficial, without, moreover, adversely affecting the typical performance qualities contributed by the reinforcing inorganic filler.

In the present account, the BET specific surface area is determined in a known way by gas adsorption using the Brunauer-Emmett-Teller method described in *The Journal of the American Chemical Society*, Vol. 60, page 309, February 1938, more specifically according to French Standard NF ISO 9277 of December 1996 (multipoint (5 point) volumetric method—gas: nitrogen—degassing: 1 hour at 160° C.—relative pressure $p/p_0$ range: 0.05 to 0.17). The CTAB specific surface area is the external surface area determined according to French Standard NF T 45-007 of November 1987 (method B).

Preferentially, the content of total reinforcing filler is between 30 and 160 phr, more preferentially between 40 phr and 160 phr. Below 30 phr, the reinforcement of the rubber composition may be insufficient to contribute an appropriate level of cohesion of the rubber component of the tyre comprising this composition. Even more preferentially, the content of total reinforcing filler is at least 50 phr. Above 160 phr, there is a risk of increasing the hysteresis and thus the rolling resistance of the tyres. For this reason, the content of total reinforcing filler is preferably within a range extending from 50 to 120 phr. Any one of these ranges of content of total reinforcing filler can apply to any one of the embodiments of the invention.

In order to couple the reinforcing inorganic filler to the diene elastomer, use may be made, in a well-known way, of an at least bifunctional coupling agent, especially a silane, (or bonding agent) intended to provide a satisfactory connection, of chemical and/or physical nature, between the inorganic filler (surface of its particles) and the elastomer. The coupling agents are, in particular, organosilanes or polyorganosiloxanes which are at least bifunctional. Use may be made of silane polysulfides, referred to as "symmetrical" or "asymmetrical" depending on their specific structure, such as described, for example, in applications WO 03/002648 (or US 2005/016651) and WO 03/002649 (or US 2005/016650).

The rubber composition in accordance with the invention may also comprise, in addition to the coupling agents or instead of the coupling agents, agents for covering the inorganic fillers or more generally processing aids capable, in a known way, by virtue of an improvement in the dispersion of the filler in the rubber matrix and of a lowering of the viscosity of the compositions, of improving their ability to be processed in the uncured state.

These covering agents are for example hydrolyzable silanes such as alkylalkoxysilanes, especially alkyltrialkoxysilanes, polyols, polyethers, primary, secondary or tertiary amines. By way of example, mention may be made of trimethoxy(octyl)silane or diphenylguanidine. The covering agents may be used alone or as a mixture.

When a coupling agent is used, the content thereof is advantageously less than 20 phr, it being understood that it is generally desirable to use as little as possible thereof. Typically, the content of covering agent represents from 0.5% to 15% by weight relative to the amount of inorganic filler. Its content is preferentially between 0.5 and 12 phr, more preferentially within a range extending from 3 to 10 phr. This content is easily adjusted by those skilled in the art depending on the content of inorganic filler used in the composition.

When one or more covering agents are used, the overall content thereof is advantageously less than 20 phr, it being understood that it is generally desirable to use as little as possible thereof. Typically, the overall content of covering agent represents from 0.5% to 15% by weight relative to the amount of inorganic filler. Its content is preferentially between 0.5 and 12 phr, more preferentially within a range extending from 3 to 10 phr. This content is easily adjusted by those skilled in the art depending on the content of inorganic filler used in the composition.

The rubber composition may additionally contain a diene elastomer other than the elastomer of use for the purposes of the invention. A "diene" elastomer (or rubber) should be understood, in a known way, as an (or several) elastomer(s) consisting, at least in part (i.e., a homopolymer or a copolymer), of diene monomer units (monomers bearing two conjugated or unconjugated carbon-carbon double bonds).

According to any one of the embodiments of the invention, the rubber composition preferentially comprises more than 50 phr, more preferentially 75 phr of the diene elastomer of use for the purposes of the invention.

The rubber composition in accordance with the invention may also comprise all or some of the usual additives customarily used in elastomer compositions intended to constitute mixtures of finished rubber articles such as tyres, such as, for example, plasticizers or extender oils, whether they are aromatic or non-aromatic, pigments, protective agents such as antiozone waxes, chemical antiozonants, antioxidants and a crosslinking system.

The crosslinking system is preferentially a vulcanization system, that is to say a system based on sulfur (or on a sulfur-donating agent) and on a primary vulcanization accelerator. To this base vulcanization system, various known secondary vulcanization accelerators or vulcanization activators are added, such as zinc oxide, stearic acid or equivalent compounds, or guanidine derivatives (in particular diphenylguanidine), or else known vulcanization retarders, which are incorporated during the first non-productive phase and/or during the productive phase, as described subsequently. The sulfur is used at a preferential content of between 0.5 and 12 phr, in particular between 1 and 10 phr. The primary vulcanization accelerator is used at a preferential content of between 0.5 and 10 phr, more preferentially of between 0.5 and 5.0 phr.

The rubber composition in accordance with the invention is manufactured in appropriate mixers, using two successive phases of preparation well known to those skilled in the art: a first phase of thermomechanical working or kneading ("non-productive" phase) at high temperature, up to a maximum temperature of between 130° C. and 200° C., followed by a second phase of mechanical working ("productive" phase) down to a lower temperature, typically below 110° C., for example between 40° C. and 100° C., during which finishing phase the crosslinking system is incorporated.

The elastomer of use for the purposes of the invention is generally introduced during the "non-productive" phase in order to be thermomechanically kneaded with the reinforcing filler and optionally the other ingredients, with the exception of the crosslinking system.

The rubber composition may be prepared by a process which comprises the following steps:
incorporating, in the elastomer, during a first "non-productive" step, the reinforcing filler and, if appropriate, a coupling agent or a covering agent, by kneading thermomechanically until a maximum temperature of between 130° C. and 200° C. is reached,
cooling the combined mixture to a temperature below 100° C.,
subsequently incorporating a crosslinking system,
kneading everything up to a maximum temperature of less than 120° C., the coupling agent, the covering agent and the crosslinking system being able to be any one of the compounds mentioned above as being able to serve as coupling agent, covering agent and crosslinking system, respectively.

Alternatively, instead of being introduced in succession, the elastomer and the reinforcing filler may be introduced in the form of a masterbatch during the first, "non-productive" step.

The final composition thus obtained is subsequently calendered, for example in the form of a sheet or a slab, especially for laboratory characterization, or else extruded in order to form, for example, a rubber profiled element used as rubber component in the preparation of the tyre.

The rubber composition in accordance with the invention may either be in the uncured state (before crosslinking or vulcanization) or in the cured state (after crosslinking or vulcanization). It is preferentially used in a tyre.

The abovementioned characteristics of the present invention, and also others, will be better understood on reading the following description of several exemplary embodiments of the invention, given by way of illustration and without limitation.

Exemplary Embodiments of the Invention

1-Measurements and Tests Used:
1-1 Determination of the Glass Transition Temperature:

The glass transition temperatures Tg of the polymers are measured by means of a differential calorimeter (differential scanning calorimeter) according to the standard ASTM D3418-08.

Size Exclusion Chromatography (SEC):

Size exclusion chromatography makes it possible to separate macromolecules in solution according to their size through columns filled with a porous gel. The macromolecules are separated according to their hydrodynamic volume, the bulkiest being eluted first. Without being an absolute method, SEC makes it possible to comprehend the distribution of the molar masses of a polymer. The various number-average molar masses (Mn) and weight-average molar masses (Mw) can be determined from commercial standards and the polymolecularity or polydispersity index (PI=Mw/Mn) can be calculated via a "Moore" calibration. There is no specific treatment of the polymer sample before analysis. The latter is simply dissolved, in a tetrahydrofuran solution containing 1% by volume of diisopropylamine, 1% by volume of triethylamine and 1% by volume of distilled water, at a concentration of approximately 1 g/l. The solution is then filtered through a filter with a porosity of 0.45 µm before injection. The apparatus used is a Waters Alliance chromatograph. The elution solvent is tetrahydrofuran that contains 1 vol % of diisopropylamine and 1 vol % of triethylamine. The flow rate is 0.7 ml/min, the temperature of the system is 35° C. and the analytical time is 90 min. A set of four Waters columns in series, with commercial names Styragel HMW7, Styragel HMW6E and two Styragel HT6E, is used. The volume of the solution of the polymer sample injected is 100 µl. The detector is a Waters 2410 differential refractometer and the software for making use of the chromatographic data is the Waters Empower system. The calculated average molar masses are relative to a calibration curve produced from PSS Ready Cal-Kit commercial polystyrene standards.

Determining the Macrogel Content:

The polymer (mass sampled P) is dissolved in toluene at a concentration of 5 g/l. The medium is stirred for at least 6 h then filtered over a metal filter (stainless steel screen) weighed beforehand (P1). The filter is then dried at 80'C under vacuum for 1 h then cooled in a desiccator for 30 min. After this treatment the screen is weighed (P2).

The insoluble content is given by the formula $$T=100*(P2-P1)/P$$

Nuclear Magnetic Resonance Spectroscopy (NMR)

The contents of carbonate functions on the polymer chain are determined by NMR analysis. The spectra are acquired on a Bruker 500 MHz spectrometer equipped with a 5 mm BBI z-grad "broad band" probe. The quantitative $^1$H NMR experiment uses a simple 30° pulse sequence and a repetition time of 3 seconds between each acquisition. The samples are dissolved in deuterated chloroform.

The $^1$H NMR spectrum makes it possible to quantify the content of carbonate functions incorporated within the chain by integration of the signals characteristic of the protons of the subunits. The abbreviation MCA denotes the monomer unit of formula (IV-u), and PB1,2 and PB1,4 denote the monomer units of the 1,3-butadiene inserted in the chain by 1,2- and 1,4-addition, respectively.

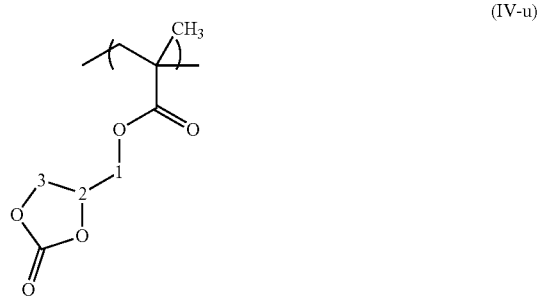

(IV-u)

4H corresponding to $CH_2$ no. 1 MCA+$CH_2$ no. 3 MCA: from 3.3 to 4.5 ppm

2H+1H corresponding to PB1,2+CH no. 2 MCA: from 4.5 to 4.9 ppm

2H+1H corresponding to PB1,4+PB1,2: from 4.9 to 5.8 ppm 5H styrene subunit: 7.41 ppm to 6.5 ppm.

The styrene distribution results are given in the form W/X/Y/Z, with:

W: n=1, 2 and 3 (random distributions): integration between 7.2 and 6.71 ppm

X: n=4 and 5 (non-random distributions): integration between 6.71 and 6.56 ppm

Y: 6≤n≤10 (microblocks): integration between 6.56 and 6.29 ppm

Z: n>10 (macroblocks): integration between 6.29 and 6.05 ppm.

Tensile Tests:

These tests make it possible to determine the elasticity stresses and the properties at break after curing. Unless otherwise indicated, they are carried out in accordance with French Standard NF T 46-002 of September 1988. The true secant moduli (i.e. calculated with reference to the real cross section of the test specimen), expressed in MPa, are measured in first elongation (that is to say without an accommodation cycle) at 100% elongation (moduli denoted M100) and 300% elongation (M300). All these tensile measurements are carried out under the standard conditions of temperature and hygrometry (23+−2[deg.]C.; 50+−5% relative humidity).

Dynamic Properties:

The dynamic properties ΔG* and tan(δ)max are measured on a viscosity analyser (Metravib VA4000) according to Standard ASTM D 5992-96. The response of a sample of vulcanized composition (cylindrical test specimen with a thickness of 4 mm and a cross section of 400 $mm^2$), subjected to a simple alternating sinusoidal shear stress, at a frequency of 10 Hz, under standard temperature conditions (23° C.) according to Standard ASTM D 1349-99 or, as the case may be, at a different temperature (60° C.), is recorded.

A strain amplitude sweep is carried out from 0.1% to 100% (outward cycle) and then from 100% to 0.1% (return cycle). The results made use of are the elastic modulus (G').

2-Reagents

Throughout the examples given below, sodium dodecyl sulfate, iron sulfate, cumene hydroperoxide, sodium pyrophosphate, potassium persulfate, tert-dodecylmercaptan, N,N-diethylhydroxylamine, resorcinol, sodium hydrogen phosphate and ammonium dihydrogen phosphate are sold by Aldrich. The 4-(hydroxymethyl)-1,3-dioxolan-2-one methacrylate is from Specific Polymers. The styrene and the butadiene are purified by passage over alumina guard and by sparging with nitrogen.

3-Synthesis of the terpolymer of styrene, butadiene and 4-(hydroxymethyl)-1,3-dioxolan-2-one methacrylate (CCMA) by cold polymerization Prior preparation of the following feedstocks:

Suspension in water of $Na_2FeP_2O_7$ at 0.0627 mol/l: $FeSO_4$, $7H_2O$ and $Na_4P_2O_7$ are diluted in sparged water, then the mixture is heated at 60° C. for 45 minutes with regular stirring Preparation of a solution of cumene hydroperoxide in styrene at 0.079 mol/l Preparation of a solution of mercaptan (R—SH) in styrene at 0.223 mol/l Preparation of a solution of N,N-diethylhydroxylamine in water at 10 g/l The reactor is loaded according to the following operations:

introduce the sparged water over half an hour at 25'C (final volume 22.3 ml)

then sodium dodecyl sulfate (SDS) under nitrogen at 25'C followed by 10 min nitrogen flushing (0.3 g)

inject the styrene feedstock containing the R—SH at 25'C under nitrogen (1 ml of solution at 0.223 mol/l)

cool the reactor to reach 5° C. when the reactor reaches approximately 12'C, inject the rest of the styrene (1.815 ml, 1.65 g) and the CCMA (0.39 ml, 0.56 g), under nitrogen then inject the butadiene feedstock (9.88 ml, 6.42 g)

leave the reactor to cool down to 5° C., then inject the solution of $Na_2FeP_2O_7$ (1.7 ml of solution at 0.0627 mol/l)

wait 5 minutes, then inject the initiator and the solution of cumene hydroperoxide in styrene (0.5 ml)

The end of the addition of initiator marks the start of the polymerization (i.e. t=0 min). Stirring is maintained at 5° C. for 7 h 15 to achieve approximately 63% of final conversion (test 1) and for 4 h 45 to achieve approximately 72% of final conversion (test 2).

Finally, a stopping solution of N,N-diethylhydroxylamine in water is prepared. The latex is then stopped by decanting by residual pressure of the monomers on this stopping solution. The latex is subsequently coagulated by addition of 50 ml of acetone. The coagulum is dried under partial vacuum and under nitrogen flushing for 48 h at 40° C.

The operating conditions for test no. 1 are listed in the following Table 1. The operating conditions for test no. 2 are listed in the following Table 2.

TABLE 1

| Water | | | 22.3 ml |
|---|---|---|---|
| SDS | 3 | phr | 0.3 g |
| RSH | 0.16 | phr | 0.016 g |
| $FeSO_4$, $7H_2O$ | 0.28 | phr | 0.028 g |
| $Na_4P_2O_7$ | 0.266 | phr | 0.026 g |
| Weight % styrene (mol %) | 30.14% | (19%) | 3.014 g |
| Weight % butadiene (mol %) | 64.23% | (79%) | 6.42 g |
| Weight % CCMA (mol %) | 5.63% | (2%) | 0.56 g |
| Cumene hydroperoxide | 0.17 | phr | 0.017 g |
| N,N-diethylhydroxylamine | 0.1 | phr | 0.01 g |

TABLE 2

| Water | | | 22.3 ml |
|---|---|---|---|
| SDS | 3 | phr | 0.3 g |
| RSH | 0.16 | phr | 0.016 g |
| $FeSO_4$, $7H_2O$ | 0.28 | phr | 0.028 g |
| $Na_4P_2O_7$ | 0.266 | phr | 0.026 g |
| Weight % styrene (mol %) | 25.47% | (18%) | 2.55 g |
| Weight % butadiene (mol %) | 54.3% | (74%) | 5.43 g |
| Weight % CCMA (mol %) | 20.23% | (8%) | 2.02 g |
| Cumene hydroperoxide | 0.17 | phr | 0.017 g |
| N,N-diethylhydroxylamine | 0.1 | phr | 0.01 g |

The polymers obtained were characterized by NMR, DSC and SEC analyses and measurement of the macrogel content. The results of the characterizations appear in Table I.

4-Preparation and Characterization of the Rubber Compositions:

In order to prepare the compositions A and T, the following tests are carried out in the following manner:

The elastomer, the reinforcing filler and the other additives are successively introduced into an internal mixer (final degree of filling: approximately 70% by volume), the initial vessel temperature of which is approximately 100° C. Thermomechanical working is then carried out (non-productive phase) in one stage (total duration of the kneading equal to approximately 5 min), until a maximum "dropping" temperature, ranging from 145° C. to 165° C. depending on the compositions, is reached. The mixture thus obtained is recovered and cooled, then the vulcanization system is added on an external mixer in order to carry out a second phase of mechanical working therein at approximately 80'C.

The rubber compositions are given in the following Table 3. The amounts are expressed in parts per 100 parts by weight of elastomer.

TABLE 3

| | Composition A | Composition T |
|---|---|---|
| Polymer A | 100 | — |
| SBR | — | 100 |
| Carbon black (1) | 1 | 1 |
| Silica (2) | 67 | 67 |
| Resin (3) | 31 | 31 |
| Antioxidant (4) | 3 | 3 |
| Paraffin | 1 | 1 |
| Trimethoxy(octyl)silane | 5.4 | 5.4 |
| Diphenylguanidine | 2.5 | 2.5 |
| Stearin (5) | 3 | 3 |
| ZnO (6) | 0.9 | 0.9 |
| Sulfur | 1 | 1 |
| Accelerator (7) | 2.3 | 2.3 |

(1) N234
(2) Micropearl silica with a specific surface area of 160 $m^2/g$
(3) Hydrogenated C9 dicyclopentadiene resin E5600 BR, Exxon Mobil
(4) N-(1,3-Dimethylbutyl)-N-phenyl-para-phenylenediamine (Santoflex 6-PPD from Flexsys)
(5) Stearin (Pristerene 4931 - Uniqema)
(6) Zinc oxide (industrial grade - Umicore)
(7) N-Cyclohexyl-2-benzothiazolesulfenamide (Santocure CBS from Flexys)

Composition A differs from composition T in that composition A contains the polymer A in accordance with the invention as elastomer, whereas composition T contains a copolymer of styrene and butadiene SBR as elastomer. The SBR devoid of carbonate functions is a polymer not in accordance with the invention. The Mooney viscosity thereof is 53, the Tg thereof is −48° C., similar to that of polymer A. The Mooney viscosity is measured using an oscillating consistometer as described in standard ASTM D1646 (1999). The measurement is carried out according to the following principle: the sample, analysed in the uncured state (i.e., before curing), is moulded (shaped) in a cylindrical chamber heated to a given temperature (100° C.). After preheating for 1 minute, the rotor rotates within the test specimen at 2 revolutions/minute and the working torque for maintaining this movement is measured after rotating for 4 minutes. Mooney viscosity is expressed in "Mooney unit" (MU, with 1 MU=0.83 newton.metre).

The compositions thus obtained are subsequently calendered, either in the form of slabs (thickness of 2 to 3 mm) or of thin sheets of rubber for the measurement of their physical or mechanical properties. The calendered compositions are then cured under a press for 30 min at 150° C., then characterized.

The results appear in Table II.

The measurement of ΔC (Cmax-Cmin), expressed as dN·m, corresponds to the difference in torque between the initial state (t=0, before vulcanization) and the final state (t=30 min, after vulcanization).

Compared to the SBR polymer, the polymer A provides the rubber composition with much better reinforcement. Indeed, the ratio of the moduli MA300/MA100 of composition A is much higher than that of composition T. The improvement in the reinforcement is obtained even in the absence of a coupling agent for coupling the silica to the elastomer. Finally, for an improved reinforcement, it is noted that the value of ΔG' of composition A is substantially lower than that of composition T, which is reflected by an improved state of dispersion of the silica of composition A compared to that of composition T.

TABLE I

| Polymer | Test | SEC characterizations | | | NMR characterizations | | | | DSC characterizations Tg/delta |
|---|---|---|---|---|---|---|---|---|---|
| | | Mn (kg/mol) | PI | Gel content (%) | CCMA Mol % | Styrene Mol % | Butadiene Mol % | Styrene distribution | |
| A | Test 1 | 83 | 3.9 | <0.3 | 2.6 | 16.2 | 81.2 | 95/4/1/0 | −48/8 |
| B | Test 2 | 89 | 2.7 | <0.3 | 10.4 | 14.5 | 75.2 | — | — |

TABLE II

| | Composition A | Composition T |
|---|---|---|
| M100 (MPa) | 3.70 | 1.18 |
| M300 (MPa) | 8.56 | 1.52 |
| M300/M100 | 2.32 | 1.29 |
| Strain at break (%) | 690 | 894 |
| ΔC (Cmax-Cmin) | 3.81 | 5.79 |
| ΔG' (0-100%) 60° C. | 0.96 | 2.14 |

The invention claimed is:

1. A rubber composition, comprising: a reinforcing filler and an elastomer, the elastomer comprising units of a 1,3-diene monomer and bearing carbonate functions, each present in a 1,3-dioxolan-2-one ring.

2. A rubber composition according to claim 1, wherein the carbonate functions are pendant.

3. A rubber composition according to claim 1, wherein the carbonate functions are present in monomer units of a vinyl monomer that is at least substituted by a group containing a 1,3-dioxolan-2-one ring.

4. A rubber composition according to claim 3, wherein the vinyl monomer is a vinyl monomer containing the group 2-oxo-1,3-dioxolan-4-yl of formula (I).

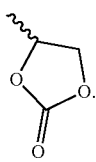

(I)

5. A rubber composition according to claim 3, wherein the vinyl monomer is a (meth)acrylate monomer of formula (II)

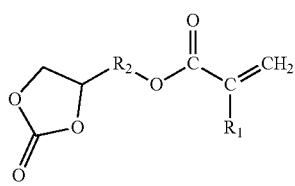

(II)

in which:
R₁ is a hydrogen or a methyl,
R₂ is a hydrocarbon-based chain which may be interrupted or substituted by one or more heteroatoms.

6. A rubber composition according to claim 5, wherein the (meth)acrylate monomer of formula (II) is selected from the group consisting of compounds of formula (III), (IV), (V) and mixtures thereof.

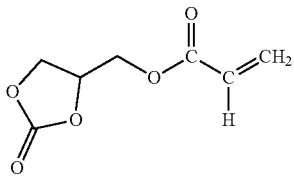

(III)

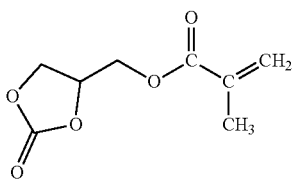

(IV)

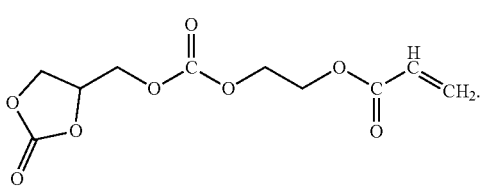

(V)

7. A rubber composition according to claim 5, wherein the (meth)acrylate monomer of formula (II) is the compound of formula (III), the compound of formula (IV), or the mixture thereof.

8. A rubber composition according to claim 1, wherein the content of carbonate functions is between 0.1 and 20 mol per 100 mol of monomer units constituting the elastomer.

9. A rubber composition according to claim 1, wherein the 1,3-diene monomer is 1,3-butadiene, isoprene or the mixture thereof.

10. A rubber composition according to claim 1, wherein the units of the 1,3-diene monomer represent more than 50% by weight of the elastomer.

11. A rubber composition according to claim 1, wherein the elastomer contains units of a vinylaromatic monomer.

12. A rubber composition according to claim 11, wherein the vinylaromatic monomer is styrene.

13. A rubber composition according to claim 11, wherein the units of the vinylaromatic monomer represent less than 45% by weight of the polymer.

14. A rubber composition according to claim 1, wherein the elastomer is a copolymer of the 1,3-diene and of the vinyl monomer or a terpolymer of the 1,3-diene, of the vinyl monomer and of the vinylaromatic monomer.

15. A rubber composition according to claim 1, wherein the reinforcing filler comprises a carbon black, an inorganic filler or the mixture thereof.

16. A rubber composition according to claim 1, wherein the reinforcing filler comprises more than 50% by weight of inorganic filler.

17. A rubber composition according to claim 15, wherein the inorganic filler is a silica.

18. A rubber composition according to claim 1, which composition comprises a crosslinking system.

19. A tire which comprises a rubber composition defined in claim 1.

20. A process for preparing a rubber composition defined in claim 18, which comprises the following steps:
- incorporating, in the elastomer, during a first "non-productive" step, the reinforcing filler and, if appropriate, a coupling agent or a covering agent, by kneading thermomechanically until a maximum temperature of between 130° C. and 200° C. is reached,
- cooling the combined mixture to a temperature below 100° C.,
- subsequently incorporating the crosslinking system,
- kneading the elastomer, the reinforcing filler, the crosslinking system, and if appropriate a coupling agent or a covering agent, up to a maximum temperature of less than 120° C.

21. A rubber composition according to claim 13, wherein the units of the vinylaromatic monomer represent less than 35% by weight of the polymer.

22. A rubber composition according to claim 18, wherein the crosslinking system is a vulcanization system.

\* \* \* \* \*